UNITED STATES PATENT OFFICE.

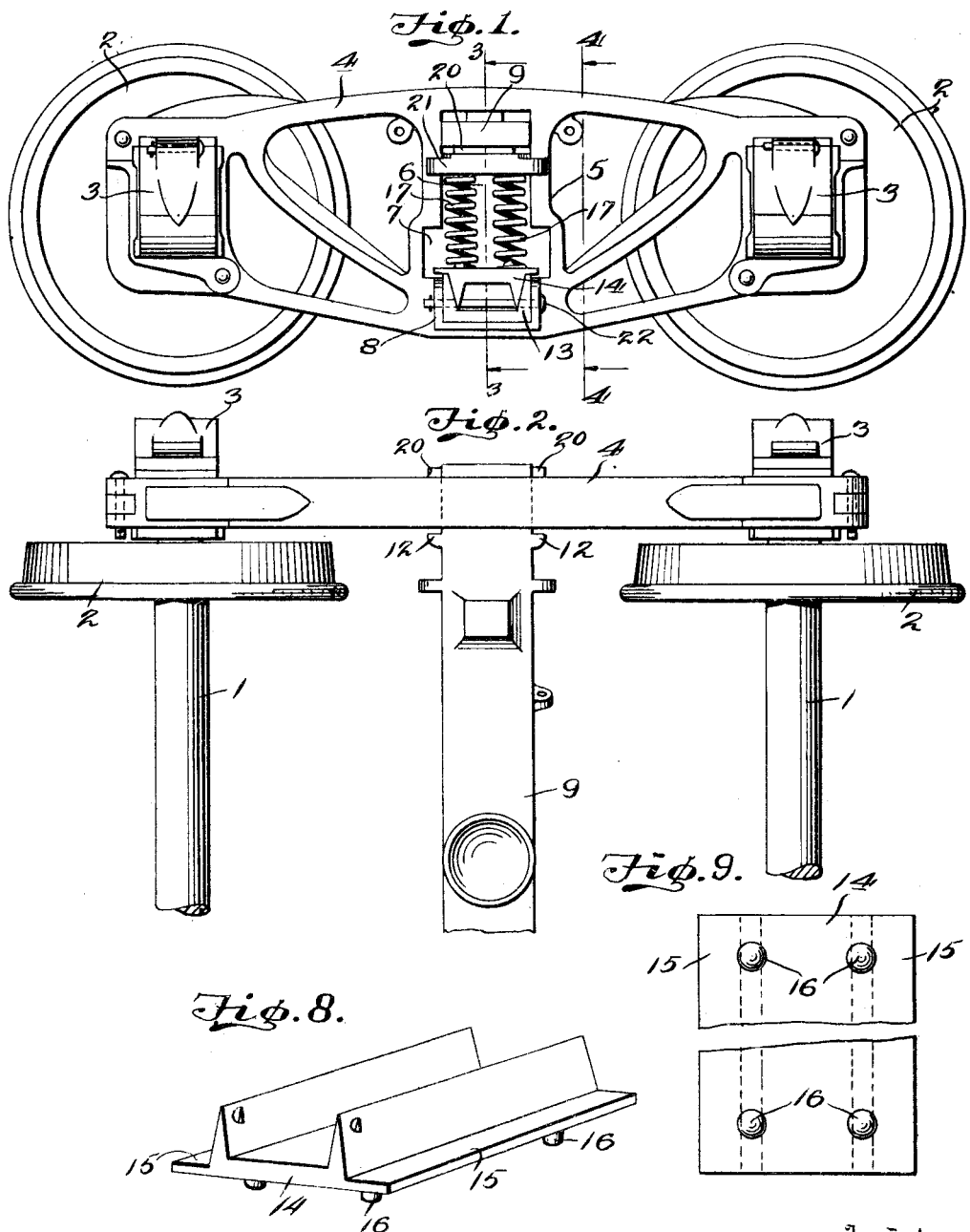

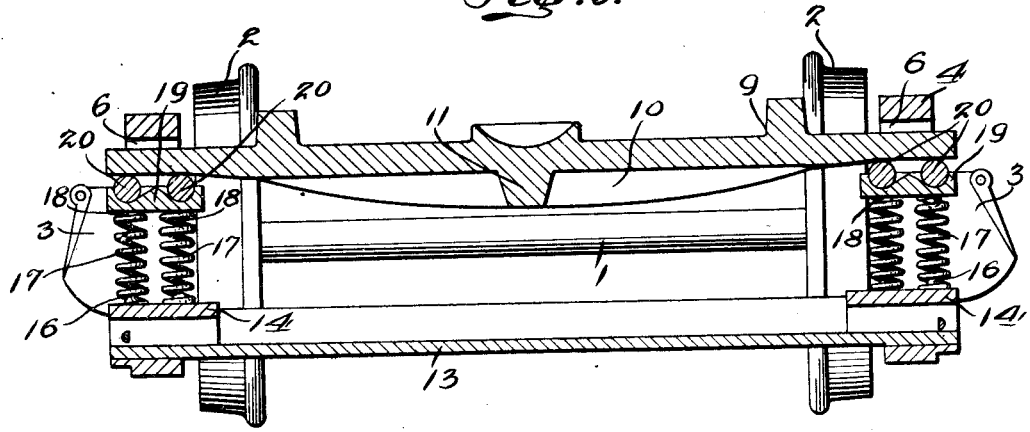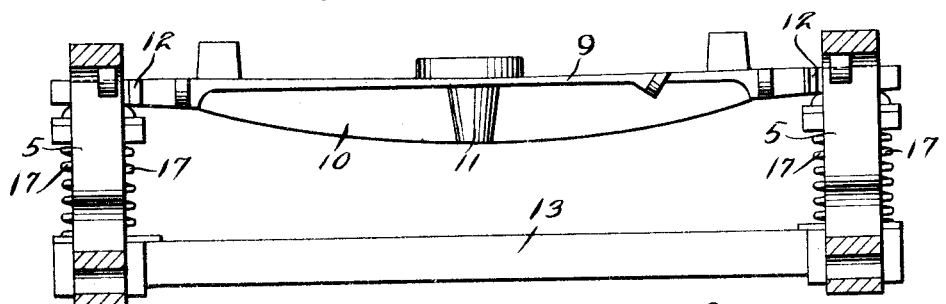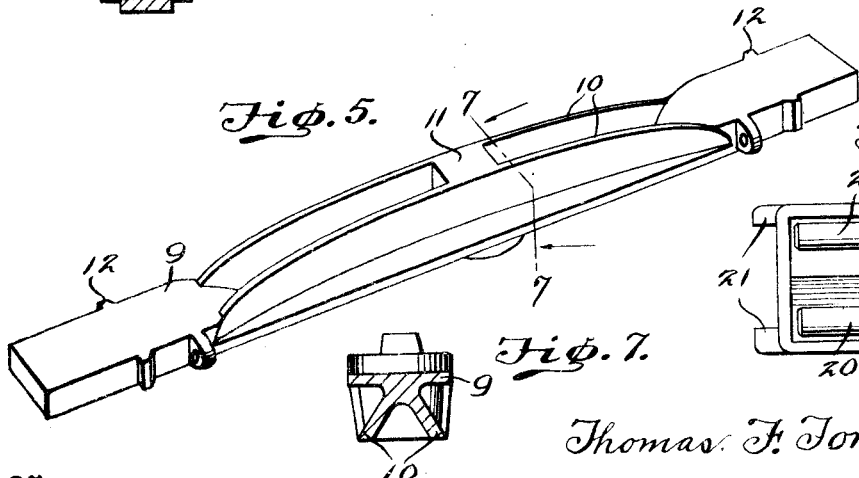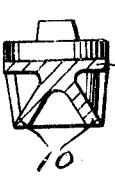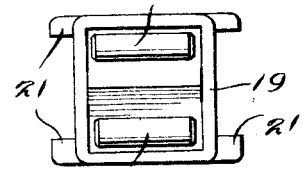

THOMAS F. TOMLINSON, OF NORFOLK, VIRGINIA.

CAR-TRUCK FRAME.

1,196,180.　　　　　Specification of Letters Patent.　　Patented Aug. 29, 1916.

Application filed May 19, 1915. Serial No. 29,182.

*To all whom it may concern:*

Be it known that I, THOMAS F. TOMLINSON, a citizen of the United States, residing at Norfolk, in the county of Norfolk and State of Virginia, have invented certain new and useful Improvements in Car-Truck Frames, of which the following is a specification.

This invention relates to truck frames, the primary object of which is to detachably associate the component parts of the frame, to expedite repair of cumbersome parts which heretofore have entailed considerable time and labor.

Another object of the invention is to simplify the general structure of the truck to facilitate assemblage and dismembering of the parts, at the same time, reducing the cost of manufacture to a minimum.

Other objects as well as the nature, characteristic features and scope of my invention will be more readily understood from the following description taken in connection with the accompanying drawings and pointed out in the claims forming a part of this specification.

Referring to the drawings: Figure 1 is a side elevational view of a frame constructed in accordance with my invention, Fig. 2 is a top plan fragmentary view of the same, Fig. 3 is a cross sectional view taken on the line 3—3 of Fig. 1, and looking in the direction of the arrows, Fig. 4 is a cross sectional view taken on the line 4—4 of Fig. 1, and looking in the direction of the arrows, Fig. 5 is an inverted perspective view of the truck bolster, Fig. 6 is a top plan view of the roller spring cap, showing the roller bearings therein, Fig. 7 is a cross sectional view taken on the line 7—7 of Fig. 5, and looking in the direction of the arrows, Fig. 8 is a perspective view of one of the spring seats, and Fig. 9 is a bottom plan fragmentary view of the same.

In the drawings a pair of axles 1 are provided which have mounted upon the opposite ends thereof wheels 2, said axles and wheels being of the usual configuration and associated in a manner well known in the art. The opposite ends of the axles 1 have journal boxes 3 associated therewith which are retained in side frames 4 of the truck frame. Each of the side frames 4 is provided approximately midway its ends with a vertical column 5, the latter having a longitudinally extending recess 6 formed therein, a portion 7 of which is enlarged, as illustrated to advantage in Fig. 1. A U-shaped supporting lip 8 is extended laterally from each of the frames 4 at the lower terminal of the longitudinally extending recess 6 of each of the columns. A bolster 9 is movably mounted in the openings 6 of said side frames 4 and is provided with parallel reinforcing ribs 10 on its under face, the latter being preferably of an arcuate configuration and being enlarged at a point approximately midway its ends, and integrally associated with a web 11, so as to withstand the strain exerted on the bolster, approximately midway the ends of the latter, by the pressure on the body-bolster, which is engaged with the truck-bolster. Ears 12 extend laterally from the side margins of the bolster 9, as shown to advantage in Fig. 5, and serve in the capacity of abutments to prevent longitudinal displacement of the bolster. A spring-plank 13 is movably mounted in the openings 6 of said side frames, subjacent the truck-bolster, and in the present instance is of the usual U-shaped configuration, the side walls thereof tapering toward the vertex, as illustrated to advantage in Fig. 1. It will be noted that the spring-plank 13 extends transversely of said frame 4, directly below the bolster 9, and receives in the upper face thereof, a pair of spring-seats 14, each of which is of the U-shaped configuration, and the arms of the U tapered toward the vertex so as to conform to the contour of the spring-plank 13, and adapted for engagement therewith, as advantageously illustrated in Fig. 1. The upper lateral margins of the spring-seats 14 are extended to provide supporting ribs 15, the latter being engaged with the free terminal of the plank 13. Studs 16 are arranged on the outer face of the vertex of the spring-seats 14 and are adapted to be encircled by coil-springs 17, the upper ends of the latter encircling studs 18 on the lower face of a roller-seat-spring cap 19. The roller-seat-spring cap 19 is provided in its upper face with depressions in which roller bearings 20 are mounted, the latter in the present instance comprising cylindrical rollers, as illustrated to advantage in Fig. 6. Each of the roller-seat-spring caps 19 is provided with side flanges 21 which abut the lateral faces of the vertical column 5, in order to prevent displacement of said roller-seat-spring caps.

In order to retain the spring-plank 13 and the spring-seat 14 from displacement, a bolt 22 is engaged through the lateral lip 8 and through the arms of the U-shaped plank 13 and the U-shaped spring-seats 14, as illustrated to advantage in Fig. 1.

Upon reference to Fig. 3 of the drawings, it will be noted that the truck-bolster 9 is appreciably spaced from the upper terminals of the longitudinally extended openings 6 in the side frames 4, this being the normal position of the bolster when the springs 17 are in their most extended position. It will therefore be appreciated that when it is desired to remove any of the parts of the truck frame, the bolster 9 may be elevated, thereby permitting the spring-plank 13, the spring-seats 14, the springs 17, and the roller-seat-spring caps 19 together with bearings, to be removed, or if desired, all of these can be removed as an entirety. Of course, if the spring-seat 14 is to be disengaged independently of the spring-plank 13, the bolt 22 will have to be first removed. It will therefore be understood that a resilient truck-frame is provided, the parts of which may be readily disassembled when so desired, thereby eliminating inadequacies which have heretofore been conspicuous in view of the time and labor consumed in the substitution of any of the parts which are rendered unsuitable for use.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. A truck frame including side frames, each of which has a transversely extending opening therein, the lower terminal of which is restricted, a spring plank, the ends of which are mounted in the restricted terminals of said openings, said plank being U-shaped in cross section to provide a channel, the sides thereof being tapered, spring seats mounted in said channel and being correspondingly tapered to facilitate engagement of the seats with the plank and removal of the same therefrom, and a bolster in resilient connection with the seat.

2. A car truck frame including side frames, a spring-plank mounted in said frames, said plank being U-shaped in cross section, spring-seats mounted on the spring-planks of an inverted U-shaped configuration for complemental sliding engagement with said plank, laterally extending lugs formed on said spring-seats for engagement with the upper margins of the spring-plank, to support said seats and facilitate removal of the same from the plank, and a bolster mounted in said frame and in resilient connection with said seat, to absorb undue shock from the bolster.

In testimony whereof I affix my signature in presence of two witnesses.

THOMAS F. TOMLINSON.

Witnesses:
 W. H. VENABLE,
 R. E. MILLER.

Copies of this patent may be obtained for five cents each, by addressing the "Commissioner of Patents, Washington, D. C."